United States Patent
Kurokawa et al.

(10) Patent No.: US 6,450,246 B1
(45) Date of Patent: Sep. 17, 2002

(54) AUTOMOTIVE AIR CONDITIONER

(75) Inventors: Katsuhiro Kurokawa; Akihiro Tsurushima, both of Tochigi (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 09/542,944

(22) Filed: Apr. 4, 2000

(30) Foreign Application Priority Data

Sep. 29, 1999 (JP) .......................................... 11-276434

(51) Int. Cl.⁷ ................................................ B60H 1/00
(52) U.S. Cl. .......................... 165/42; 454/141; 454/160
(58) Field of Search .......................... 165/42, 43, 201, 165/202, 203, 204; 454/69, 75, 121, 126, 143, 160, 159, 161, 139, 141

(56) References Cited

U.S. PATENT DOCUMENTS

| | | | | |
|---|---|---|---|---|
| 4,653,386 A | * | 3/1987 | Hayakawa et al. ...... 454/121 X |
| 4,852,638 A | | 8/1989 | Hildebrand et al. .......... 165/42 |
| 5,350,335 A | * | 9/1994 | Andersson ................... 454/121 |
| 5,399,120 A | * | 3/1995 | Burns et al. ............. 454/121 X |
| 5,701,949 A | | 12/1997 | Yamaguchi et al. .......... 165/42 |
| 5,779,535 A | * | 7/1998 | Bendell et al. ............. 454/121 |
| 6,048,263 A | * | 4/2000 | Uchida et al. .............. 454/121 |

FOREIGN PATENT DOCUMENTS

| | | |
|---|---|---|
| JP | 06-018018 | 3/1994 |
| JP | 06-018021 | 3/1994 |
| JP | 08-132852 | 5/1996 |
| JP | 08-282248 | 10/1996 |
| JP | 09-099725 | 4/1997 |
| JP | 09-123748 | 5/1997 |
| JP | 09-267620 | 10/1997 |
| JP | 10-297249 | 11/1998 |
| JP | 11-078482 | 3/1999 |
| JP | 11-099818 | 4/1999 |
| JP | 11-099820 | 4/1999 |
| JP | 11-235921 | 8/1999 |
| JP | 11-254942 | 9/1999 |

* cited by examiner

Primary Examiner—Ljiljana Ciric
(74) Attorney, Agent, or Firm—Foley & Lardner

(57) ABSTRACT

An automotive air conditioner for improved assembly, work efficiency, and reduced manufacturing costs has a slide type air mixing door. An upstream side case is provided which defines therein an upstream air passage. A downstream side case is provided which defines therein first and second downstream air passages which extend in parallel to an air mix chamber. An evaporator is installed in the upstream air passage, and a heater core is installed in the first downstream air passage. A mixing door assembly is detachably disposed between the upstream and downstream side cases. The mixing door assembly constitutes a cassette which comprises a door housing, a slide door member sliding in the door housing and a sliding device for driving the slide door member.

14 Claims, 7 Drawing Sheets

AUTOMOTIVE AIR CONDITIONER

BACKGROUND OF THE INVENTION

1. Field of the Invention

The present invention relates to an automotive air conditioner which can control airflow of both heated and cooled air by sliding a mixing door inside of a case.

2. Description of Prior Art

In order to clarify the task of the present invention, some conventional automotive air conditioners will be briefly described before describing the detail of the present invention.

One of the conventional air conditioners is of a type which comprises an intake unit through which outside/inside air is taken in, a cooler unit with an evaporator through which the air is cooled and a heater unit with a heater core through which the air is heated. As is known, the evaporator is a device set in a refrigerant circulation cooling system, through which a low temperature-low pressure refrigerant from an expansion valve flows for cooling air passing therethrough, and the heater core is a device through which a warmed engine cooling water from an operating engine flows for heating air passing therethrough. The air intake unit, the cooler unit and the heater unit are aligned in a case and mounted on a front space of a passenger room of the vehicle. However, due to the aligned arrangement of these three units, the air conditioners of this type tend to have a longer and bulky construction and thus they are not suitable for small-sized motor vehicles.

In view of the above, one compact air conditioner has been proposed and put into practical use for such small-sized motor vehicles, which is disclosed in Japanese Patent First Provisional Publication 8-282248. The air conditioner has such a construction that the evaporator and the heater core are stood and arranged closely in a case and aligned longitudinally in a motor vehicle. For obtaining much compact construction, a measure is further employed wherein the cooler and heater units are integrated, by which the evaporator and heater core can be much closer to each other.

In operation, through the intake unit, air is led to the evaporator to be cooled and then distributed, by means of an air mix door, to upper and/or lower air flow passages, the lower air passage having the heater core installed therein. The air mix door is of a slide door type that slides up and down in front of mouth portions of the upper and lower air flow passages. Due to usage of this slide type door, the distance between the evaporator and the heater core can be shortened. The cooled air directed to the lower air passage is heated by the heater core and led to an air mix chamber where it is mixed with the cooled air that has passed through the upper air passage. Thus, the temperature of the air mixed in the air mix chamber depends on the work position of the air mix door. The mixed air thus having a certain temperature is then distributed to various portions of a passenger room through various air blowing openings formed in the case. Usually, mode doors are provided to the air blowing openings for providing the air conditioner with a plurality of air distribution modes.

For moving the slide type air mix door in the above-mentioned manner, a driving mechanism is employed which generally comprises a rack which is provided on the air mix door, a gear which is rotatably held by the air conditioner case and meshed with the rack and an electric actuator which drives the gear. Thus, when the electric actuator is energized for a given time, the gear is rotated by a certain angle and thus the air mix door is moved up or down to a desired work position.

However, even the above-mentioned compact air conditioner has the following drawback.

Due to its inherent construction, the air conditioner needs a troublesome and time-consumed assembling work. In fact, various parts, such as air mix door, gear, mode doors and the like should be installed in a limited space of the case. The case is of a split type including a front-half case for upstream air passsage and a rear-half case for downstream air passage. At the time of assembly, only the rear-half case is stood on a supporting jig with its open side facing upward, then the mode doors, air mix door and gear are put into the rear-half case from the open side to be set in predetermined positions, and then the upper-half case is put on the rear-half case to cover the open side of the same. Thus, position adjustment of the various parts should be done awkwardly in such a limited space of the rear-half case before putting the front-half case onto the rear. The position adjustment work becomes much severe when the positioning points needed by the parts increase. That is, the air conditioner of the publication needs a trouble some and time-consumed assembling work, which lowers the assembly work efficiency.

SUMMARY OF THE INVENTION

It is therefore an object of the present invention to provide an automotive air conditioner which can be assembled with easy assembling work.

It is another object of the present invention to provide an air conditioner which has a reduced manufacturing cost.

It is still another object of the present invention to provide an air conditioner which employs a slide type mixing door member.

It is a further object of the present invention to provide a measure for achieving the above-mentioned objectives.

It is a still further object of the present invention to provide an automotive air conditioner which generally comprises an upstream side case, a downstream side case and a mixing door assembly. The upstream side case defines therein an upstream air passage in which an evaporator is installed. The downstream side case has therein a first downstream passage which flows air heated by a heater core installed therein and a second downstream passage which bypasses the heater core. The airflow ratio between the first and second downstream passages is regulated by a slide type mixing door installed in the mixing door assembly. The mixing door is driven by an electric actuator through a sliding device. The mixing door assembly is detachably disposed between the upstream and downstream side cases.

According to a first aspect of the present invention, there is provided an automotive air conditioner, which comprises an upstream side case defining therein an upstream air passage; a downstream side case defining therein first and second downstream air passages which extend in parallel to an air mix chamber; an evaporator installed in the upstream air passage; a heater core installed in the first downstream air passage; and a mixing door assembly detachably disposed between the upstream and downstream side cases for varying the open degree of the first and second downstream air passages relative to the upstream air passage.

According to a second aspect of the present invention, there is provided an automotive air conditioner, which comprises an upstream side case defining therein an upstream air passage; a downstream side case defining therein first and second downstream air passages which extend in parallel to an air mix chamber defined in the downstream side case, respective mouth portions of the first and second downstream air passages facing a downstream end of the upstream air passage when the upstream and downstream side cases are coupled; an evaporator installed in the upstream air passage; a heater core installed in the first downstream air passage; and a mixing door assembly detachably disposed between the upstream and downstream side cases. The mixing door assembly includes a door housing and a slide type door member which is slidably installed in the door housing for varying an airflow rate between the first and second downstream passages.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
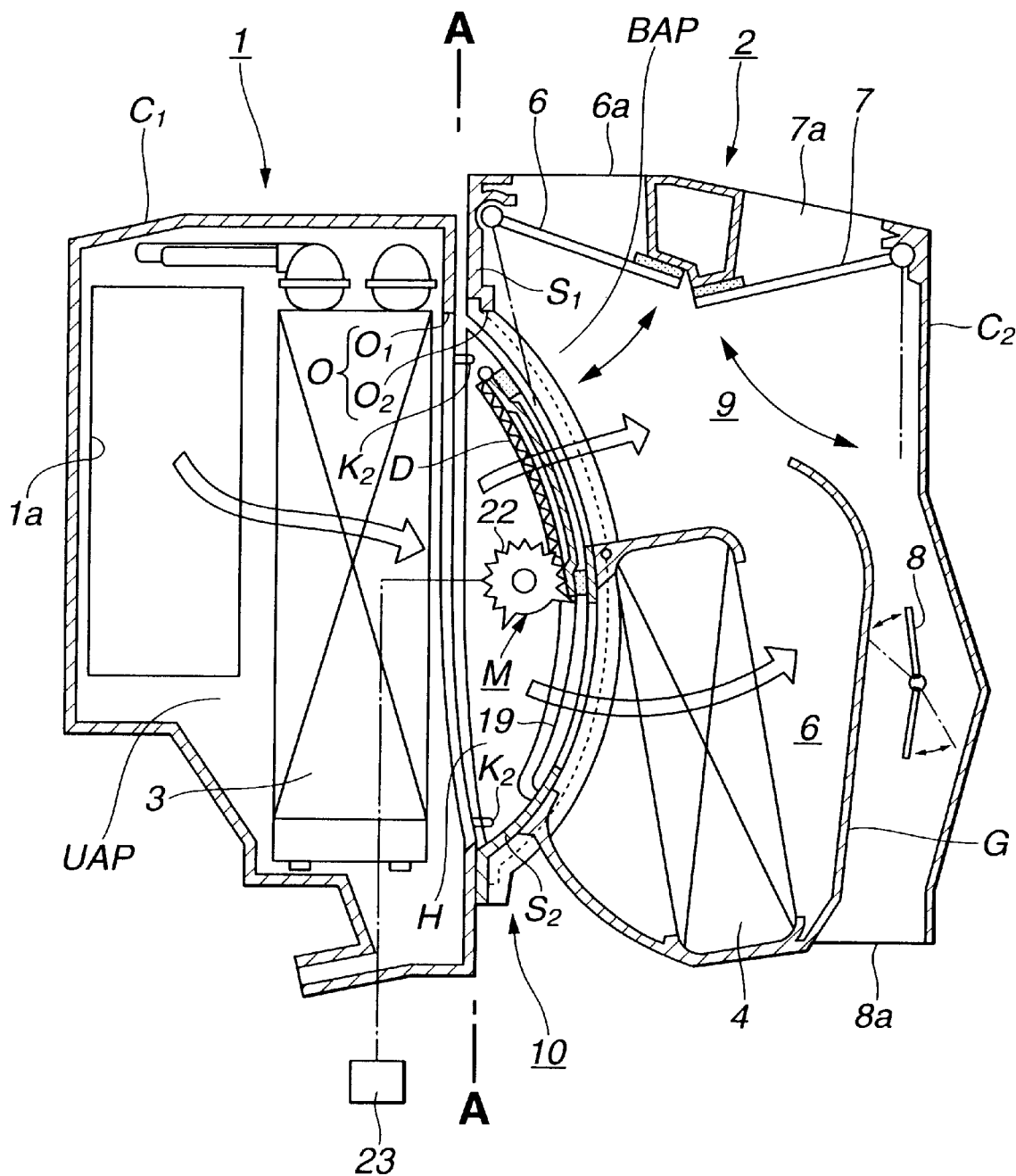
FIG. 1 is a schematic cross-sectional view of an automotive air conditioner according to the present invention.

In the following, an automotive air condition of the present invention will be described in detail with reference to the drawings.

For ease of understanding, the description will proceed with the aid of directional terms such as, upper, lower, right, left, upward, downward and the like. It is however to be noted that such terms are to be understood with respect to only the drawing or drawings on which the corresponding parts or construction is illustrated.

Figure 2:
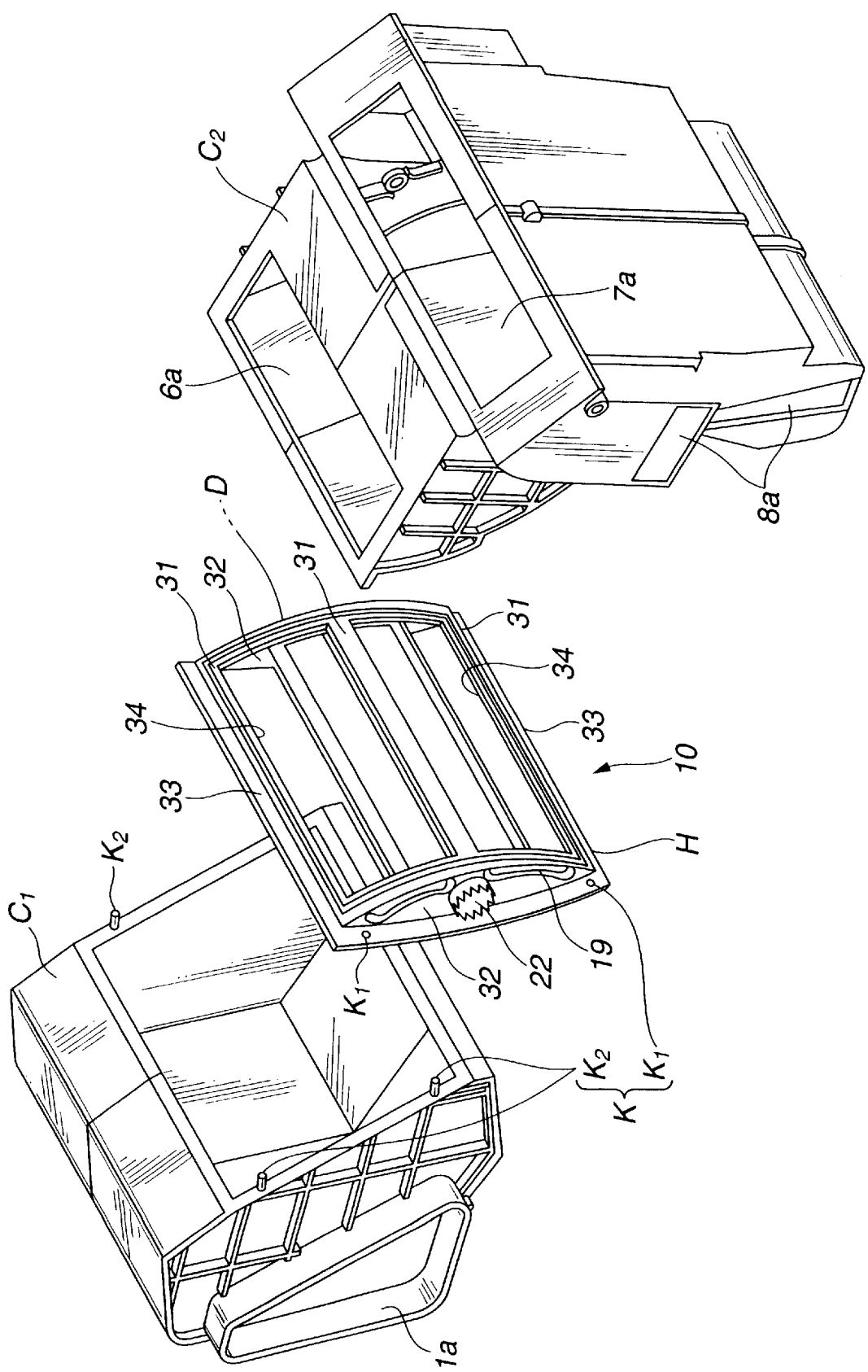
FIG. 2 is an exploded perspective view of the air conditioner.
Figure 3:
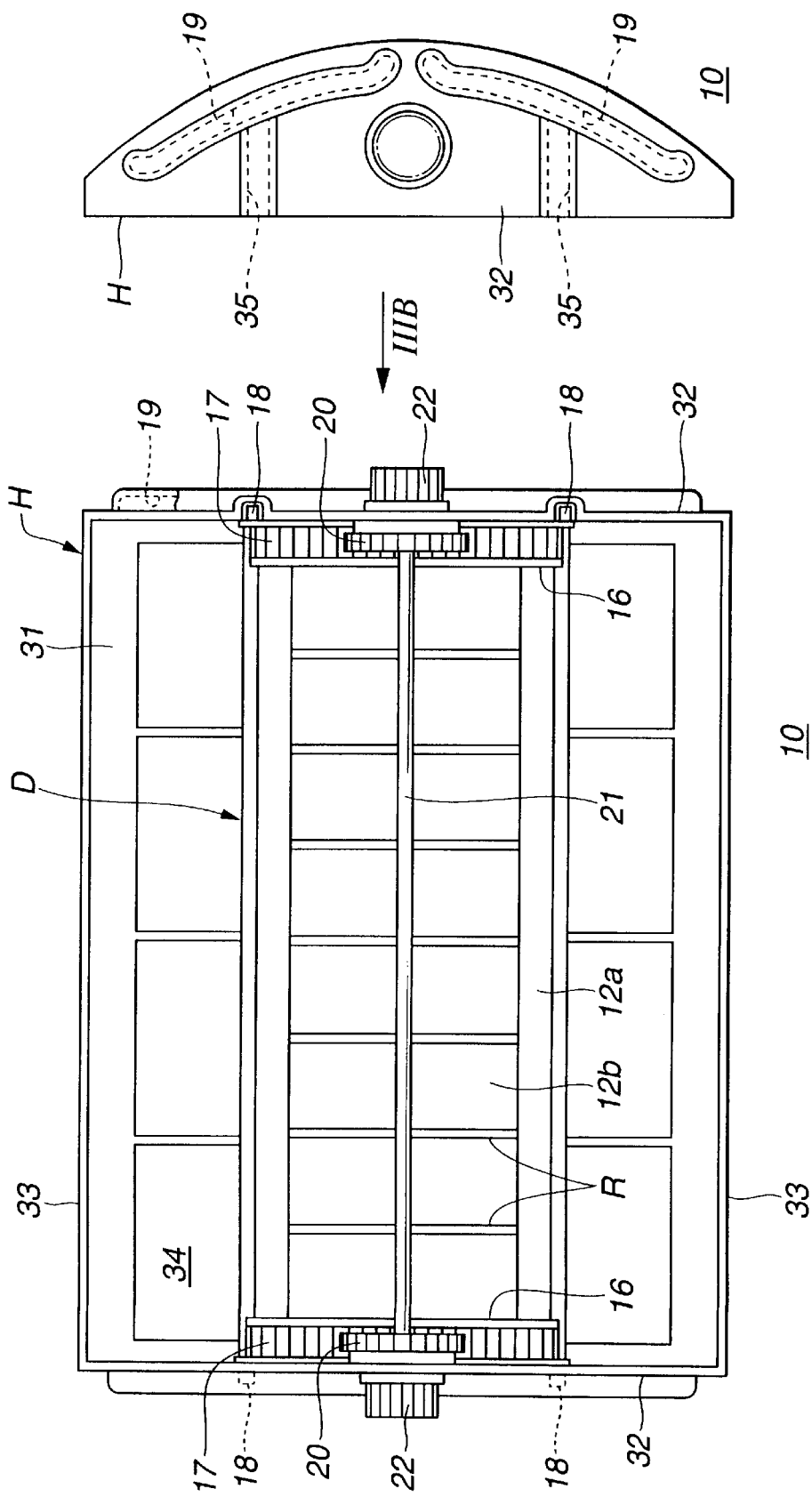
FIG. 3A is a front view of a mixing door assembly taken from the upstream air side.
FIG. 3B is a side view of the mixing door assembly taken from the direction of arrow IIIB of FIG. 3A.

Referring to FIGS. 1–7, particularly FIGS. 1 and 2, there is shown an automotive air conditioner according to the present invention.

As is seen from FIGS. 1 and 2, the automotive air conditioner of the invention comprises a cooler unit (1) and a heater unit (2) which are parallelly installed in the fore-and-aft direction in a motor vehicle. The cooler unit (1) and the heater unit (2) are separated at the line A—A of FIG. 1, and the cooler unit (1) has an upstream side case (C1), and the heater unit (2) a downstream side case (C2).

The upstream side case (C1) has an upstream air passage UAP in which an evaporator (3) is installed, and the downstream side case (C2) has two downstream passages which will be described hereinlater. The upstream side case (C1) and the downstream side case (C2) are vertically separated, however, the upstream side case (C1) and downstream side case (C2) cab be coupled to constitute a case (C).

The air conditioner further comprises an intake unit (not shown) which introduces air to the upstream air passage UAP through an inlet (1a). The air flows to the evaporator (3) to be cooled. From a downstream end of the upstream air passage UAP, there extend two, that is, upper and lower downstream passages whose mouth portions are controllable in sectional area by a mixing door member (D) which is operatively set in a mixing door assembly (10). The lower downstream passage has a heater core (4) installed therein. The upper downstream passage is a bypass air passage BAP which bypasses the heated air passage HAP. The bypass air passage BAP and the heated air passage HAP are mated at their downstream portions to form an air mixing chamber (9). By changing the position of the mixing door member (D), air mixing rate between cooled air from the bypass air passage BAP and heated air from the heated air passage HAP at the air mixing chamber (9) is varied. For sliding the mixing door member (D), a sliding device (M) is employed.

When the mixing door member (D) assumes an intermediate position, the cooled air from the upstream air passage UAP can pass through both the heated air passage HAP and the bypass air passage BAP separately, and thus under this condition, the heated air and cold air enter the air mixing chamber (9) where they mix to have a predetermined temperature. The case (C) further comprises various pivotal mode doors (6, 7, 8) and various outlets (6a, 7a, 8a). Each of the mode doors (6, 7) has one end which is pivotally held by a pin positioned in the corner of the downstream side casing (C2), and has a free end which can abut against a polygonal wall (no numeral). The outlets (6a, 7a) are separated by the polygonal wall. The mode door (8) is affixed between the outlet (8a) and the air mixing chamber (9), as shown. The outlet (8a) is separated from the heated air passage HAP by a curved guide wall G. That is, the various outlets (6a, 7a, 8a) correspond to various air distribution modes which are given when the mode doors (6, 7, 8) are automatically opened and closed. When any of the outlets (6a, 7a, 8a) is opened, temperature-conditioned air is blown into the vehicle compartment from the opened outlet (6a, 7a or 8a).

As is seen from FIGS. 1 and 2, in the present invention, the mixing door assembly (10) is detachably,sandwiched between the upstream side case (C1) and the downstream side case (C2). The mixing door assembly (10) is made like a cartridge to make the assembly work easy and to reduce the manufacturing cost.

That is, the mixing door assembly (10) comprises the mixing door member (D) to which the sliding device (M) is operatively engaged in an after-mentioned manner. The mixing door assembly (10) and the sliding device (M) are installed at generally a right angle in a convex recess defined by a door housing (H), as seen from FIGS. 1 and 5.

It is to be noted that the mixing door assembly (10) and the sliding device (M) constitute a cartridge which can be detachably put into a desired position with ease.

As is seen from FIG. 1, the upstream side case (C1) has a first opening (O1), and the downstream side case (C2) has a second opening (O2) and support portions (S1, S2). The first opening (O1) and the second opening (O2) become to face each other to constitute an opening portion (O) when the two side cases (C1, C2) are coupled. The support portions (S1, S2) extend along the peripheral surface of the second opening (O2) of the downstream side case (C2). The mixing door member (D) is arranged between the upstream side case (C1) and the downstream side case (C2) and held by the support portions (S1, S2).

As is seen from FIG. 2, the door housing (H) for the door member (D) has through holes (K1) through which projections (K2) of the upstream side case (C1) pass. The upper and lower through holes (K1) and the upper and lower projections (K2) thus constitute stopping and positioning means (K).

If desired, recesses may be employed in place of the through holes (K1), in which the projections (K2) fit.

The mixing door member (D) has a size to sufficiently close each of the mouth portions of the heated air passage HAP and the bypass air passage BAR In other words, the mixing door member (D) has a length of half the distance of the opening portion (O) from top to bottom and a same width as the opening portion (O).

Figure 4:
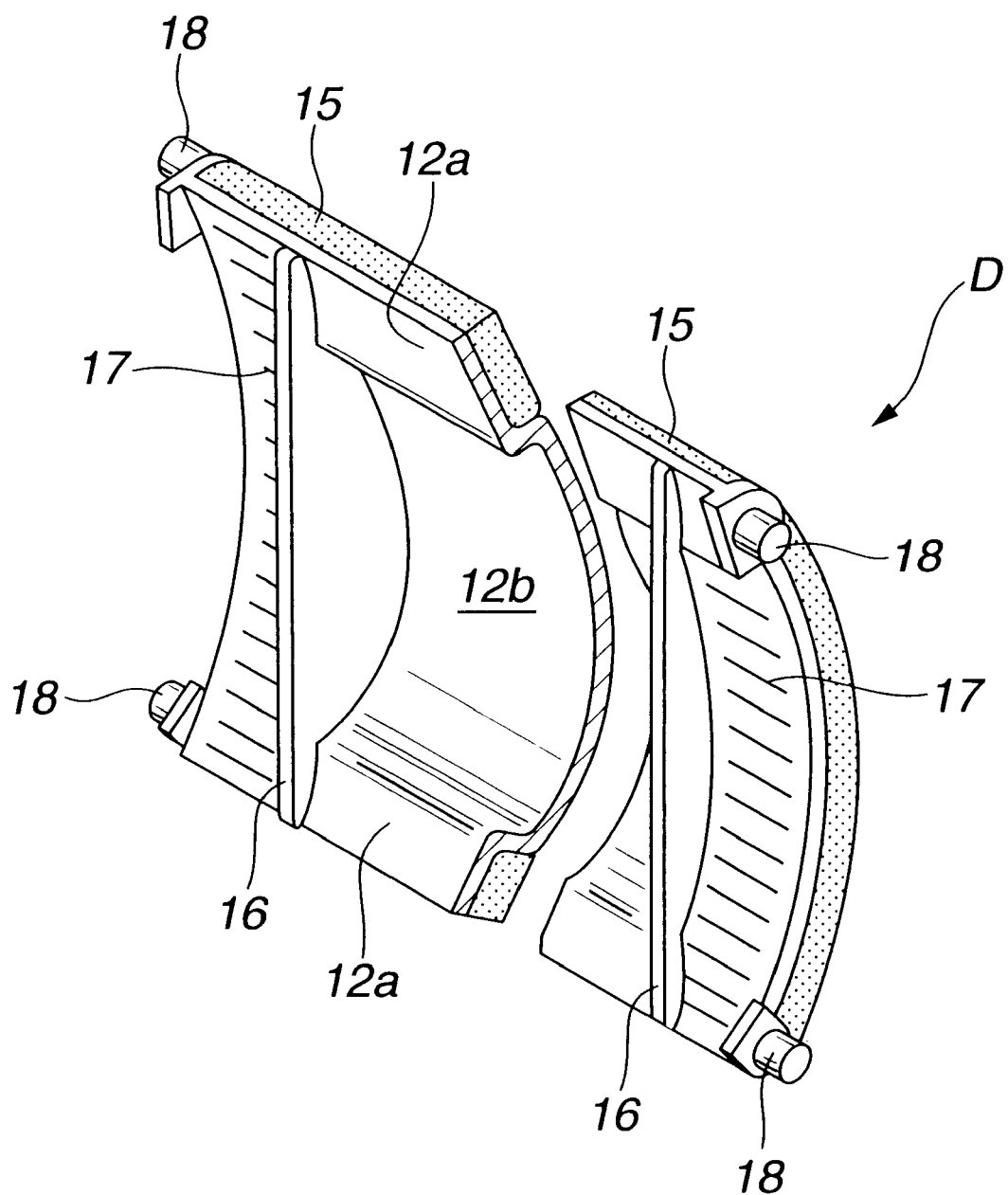
FIG. 4 is a schematic perspective view of a mixing door member of the mixing door assembly, with one part cut away.

As is seen from FIG. 4, the mixing door member (D) comprises a dome-shaped bulge portion (12b) and two flat portions (12a) provided at upper and lower ends of the bulge portion (12b). A seal member (15) is affixed to a convex outside surface of the mixing door member (D). As shown in FIG. 3A, the bulge portion (12b) may have a plurality of reinforcement ribs (R) which extend from top to bottom.

Referring back to FIG. 4, the mixing door member (D) has two spaced reinforcement plates (16) integrated therewith, which can function as an air guide means. As shown, the two reinforcement plates (16) are built in both ends of the bulge portion (12b). The mixing door member (D) has at laterally outsides of the reinforcement plates (16) respective arcuate sections, each having an arcuate rack (17). Each rack (17) extends from a top edge to a bottom edge of the arcuate section. The two racks (17) are meshed with respective gears (20) which are coaxially connected through a shaft (21).

As is seen from FIG. 1, the gears (20) are driven by an electric actuator (23) through a transmission device in such a manner as will become apparent hereinafter. The electric actuator (23) may comprises an electric motor and a speed reduction gear.

The mixing door member (D) further has guide rollers (18) which protrude from the four corners of the door member (D). As is understood from FIG. 3B, opposed side walls of the door housing (H) have each a pair of guide grooves (19) with which the two guide rollers (18) of the mixing door member (D) are rotatably engaged. Thus, upward and downward sliding movement of the mixing door member (D) in the door housing (H) is guided by the guide grooves (19). Due to the arcuate shape of each guide groove (19), the upward and downward movement of the mixing door member (D) is smoothly swung. If desired, in place of the guide rollers (18), fixed guide pins may be used, which are slidably engaged with the guide grooves (19).

Since the mixing door member (D) has a concave inside surface (12b) which faces upstream, air flow directed to the mixing door member (D) is smoothly guided to a desired position without air resistance.

Figure 5:
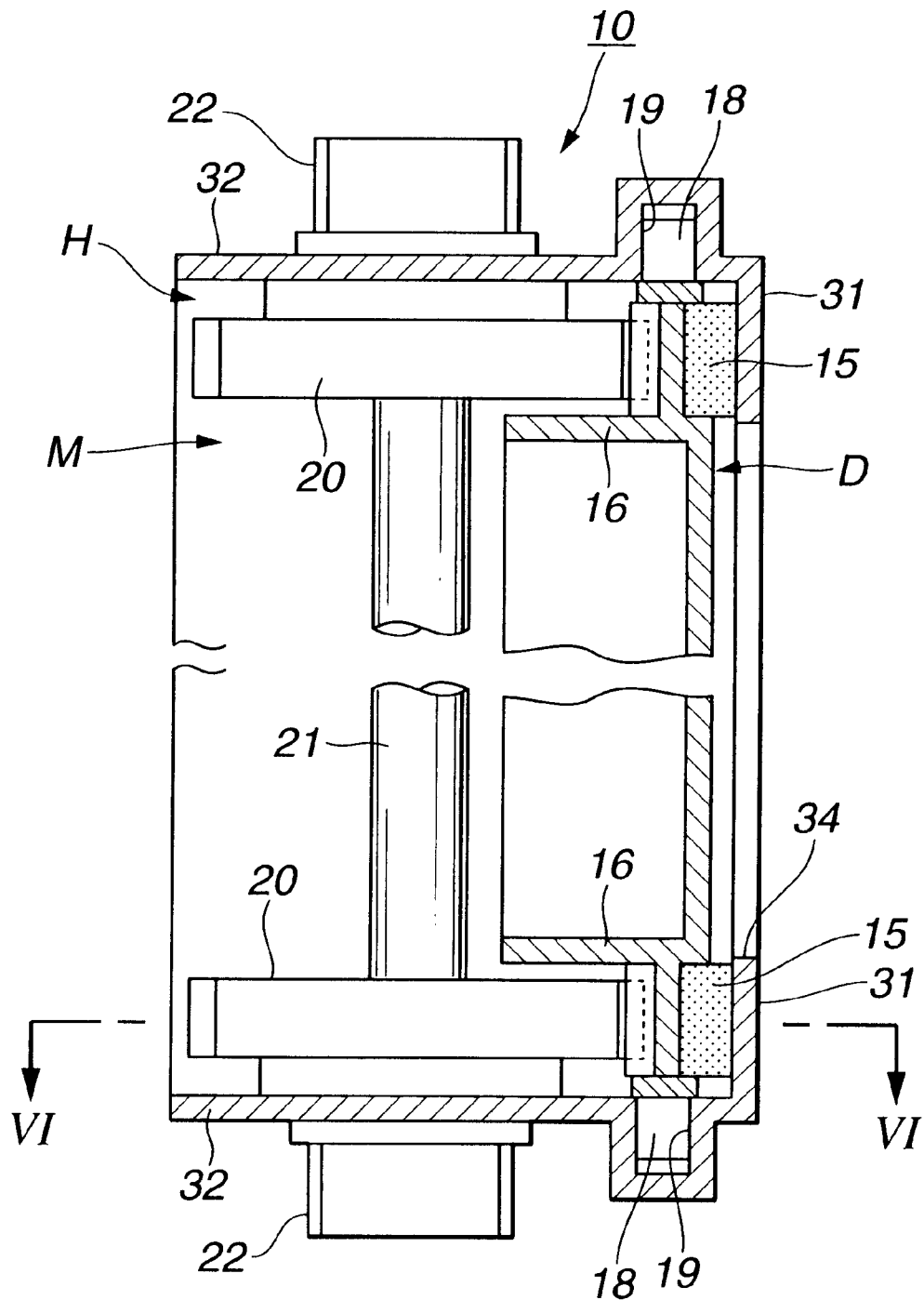
FIG. 5 is a horizontal sectional view of the mixing door assembly.

In FIG. 5, there is shown the mixing door assembly (10), which comprises the mixing door member (D) and the sliding device (M).

The detail of this mixing door assembly (10) will be described in detail in the following.

As is mentioned hereinabove, the sliding device (M) comprises the guide grooves (19) which are formed in the side walls (32) of the door housing (H), the two gears (20) which mesh with the arcuate racks (17) formed on the inner surface of the mixing door member (D), and the shaft (21) for connecting the two gears (20).

As is seen from FIGS. 3A and 5, each gear (20) has an input gear portion (22) to which the power from the electric actuator (23, see FIG. 1) is transmitted through the transmission device. The transmission device may be a series of gears. As is seen from FIGS. 3A and 3B, the gears (20) are rotatably held in respective openings (no numerals) formed in the side walls 32 of the door housing H.

Figure 7:
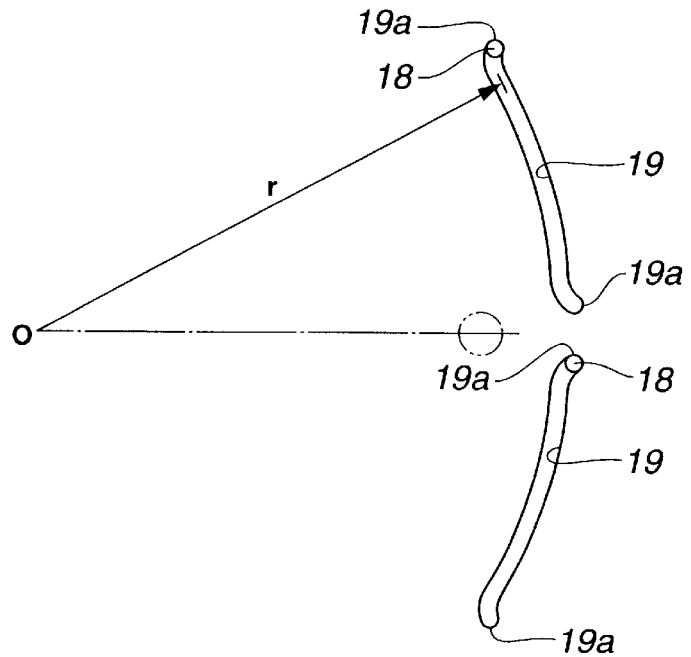
FIG. 7 is an explanatory drawing, showing a pair of groove grooves formed in one side wall of a door housing of the mixing door assembly.

As is seen from FIG. 7, each guide groove (19) has practically the same radius of curvature (r) as the mixing door member (D). The four guide rollers (18) of the mixing door member (D) are respectively engaged with and supported by the guide grooves (19). Thus, therefore, even when marked air pressure is applied to the mixing door member (D), the mixing door member (D) can move stably without any play.

Each guide groove (19) has at its upper and lower ends bent portions (19a). When the mixing door member (D) comes to its uppermost or lowermost stop position, the upper and lower guide rollers (18) are brought to the upper or lower bent ends (19a) of the corresponding guide grooves (19).

The bent end portions (19a) of the guide grooves (19) are angled rearward (that is, towards the downstream side). Thus, when coming to the uppermost or lowermost stop position, the mixing door member (D) is shifted obliquely rearward in a predetermined arcuate sliding direction.

Upon this, the seal member (15) abuts and is pressed against partition walls (31) of the door housing (H), improving the sealing. The seal member (15) normally does not abut against the partition walls (31). That is, only when it is really needed, the seal member (15) abuts against the partition walls (31). Thus, insufficient sealing is prevented for a longer period of time and the life of the seal member (15) is increased. Furthermore, when the mixing door member (D) moves upward or downward, rubbing does not occur because the sealing member (15) is kept away from the partition wall (31).

As is mentioned hereinabove, the door housing (H) has the partition walls (31) which is recess-shaped in the same airflow direction as the mixing door member (D). As is seen from FIG. 2, the door housing (H) comprises the partition walls (31), the two side walls (32) and top and bottom walls (33). The top and bottom walls (33) have respective air passage portions (34) for air to pass therethrough. The shape and size of each air passage portion (34) are established in a manner sufficient to prevent airflow resistance and to improve rigidity of the door housing (H).

As is seen from FIG. 3B, for inserting or engaging the guide rollers (18) into or with the corresponding guide grooves (19), leading grooves (35) are formed in the side walls (32) of the door housing (H).

Figure 6:
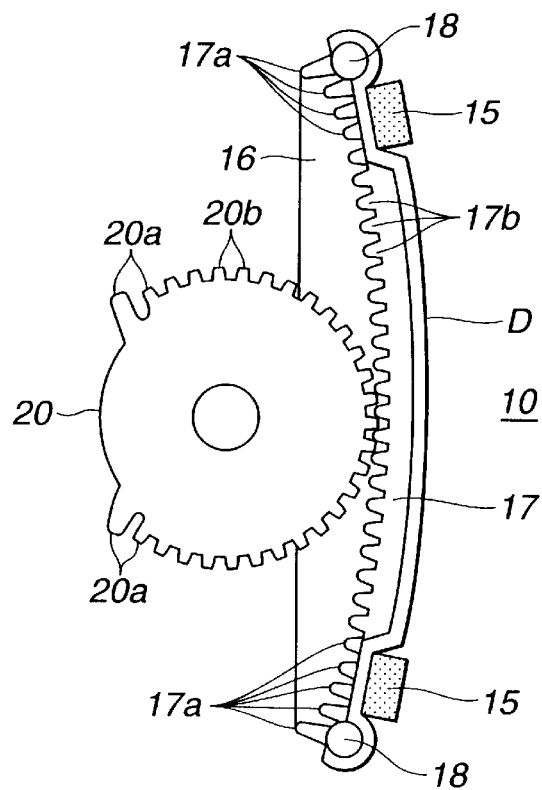
FIG. 6 is a sectional view taken along the line VI—VI of FIG. 5.

As is understood from FIG. 6, each gear (20) comprises a plurality of taller teeth (20a) which are positioned at each end of a row of shorter teeth (20b). When now the gear (20) is rotated, the rack (17) and thus the mixing door member (D) is moved upward or downward along a given way determined by the guide grooves (19) along and in which the guide rollers (18) move.

Furthermore, each rack (17) of the mixing door member (D) has a plurality of taller teeth (17a) which are located at each end (that is, top and bottom) of a row of shorter teeth (17b). The taller teeth (17a) vary in size, becoming gradually taller in the direction away from the shorter teeth (17b). Thus, therefore, the radius of curvature (r) between a tooth tip of the taller tooth (17a) and a center of rotation (O) varies from tooth to tooth. With this, the taller teeth (17a) and the shorter teeth. (17b) of the rack (17) can surely mesh with the taller teeth (20a) and the shorter teeth (20b) of the gear (20) respectively, moving the mixing door member (D) along the given way.

For assembling the air conditioner, the following assembling steps are taken.

First, the mixing door assembly (10) is previously assembled. That is, the mixing door member (D), the gears (20) and the shaft (21) are installed in the door housing (H), and the electric actuator (23) is attached to one side wall (32) of the door housing (H).

Then, the evaporator (3) is installed in the upstream side case (C1) and the heater core (4) is installed in the downstream side case (C2). These two side cases (C1, C2) are set in a given position of the vehicle body in the fore-and-aft direction keeping a certain space between the two side cases.

Then, the mixing door assembly (10) is brought to and set in the space between the upstream side case (C1) and the downstream side case (C2). For this setting, the projections (K2) of the upstream side case (C1) are tightly mated with the through holes (k1) of the door housing (H).

Thus, when assembly of the air conditioner is done in the above-mentioned manner, the previously assembled mixing door assembly (10) is automatically set between the cooling unit (1) and the heating unit (2).

As is understood from the above, setting of the mixing door assembly (10) to a proper position is readily achieved by only fitting the projections (K2) of the upstream side case (C2) in the through holes (K1) of the door housing (H). The projections (K2) and the through holes hold the mixing door assembly (10) at a predetermined position between the upstream side case (C1) and the downstream side case (C2). Thus, manufacture of the air conditioner becomes very easy, the work efficiency is improved, and manufacturing cost is reduced.

Furthermore, the air conditioner of the invention is widely applicable to various type motor vehicles only by changing the size of the upstream side case (C1), the downstream side case (C2) and the mixing door assembly (10).

Due to the above-mentioned construction of the air conditioner, the mixing door assembly (10) can be easily removed from the case (C). Thus, the case (C), the mixing door member (D), and the sliding device (M) may be separated after use, making recycling of each unit easy. Further, if desired, only the mixing door assembly (10) may be removed for maintenance.

Figure 8:
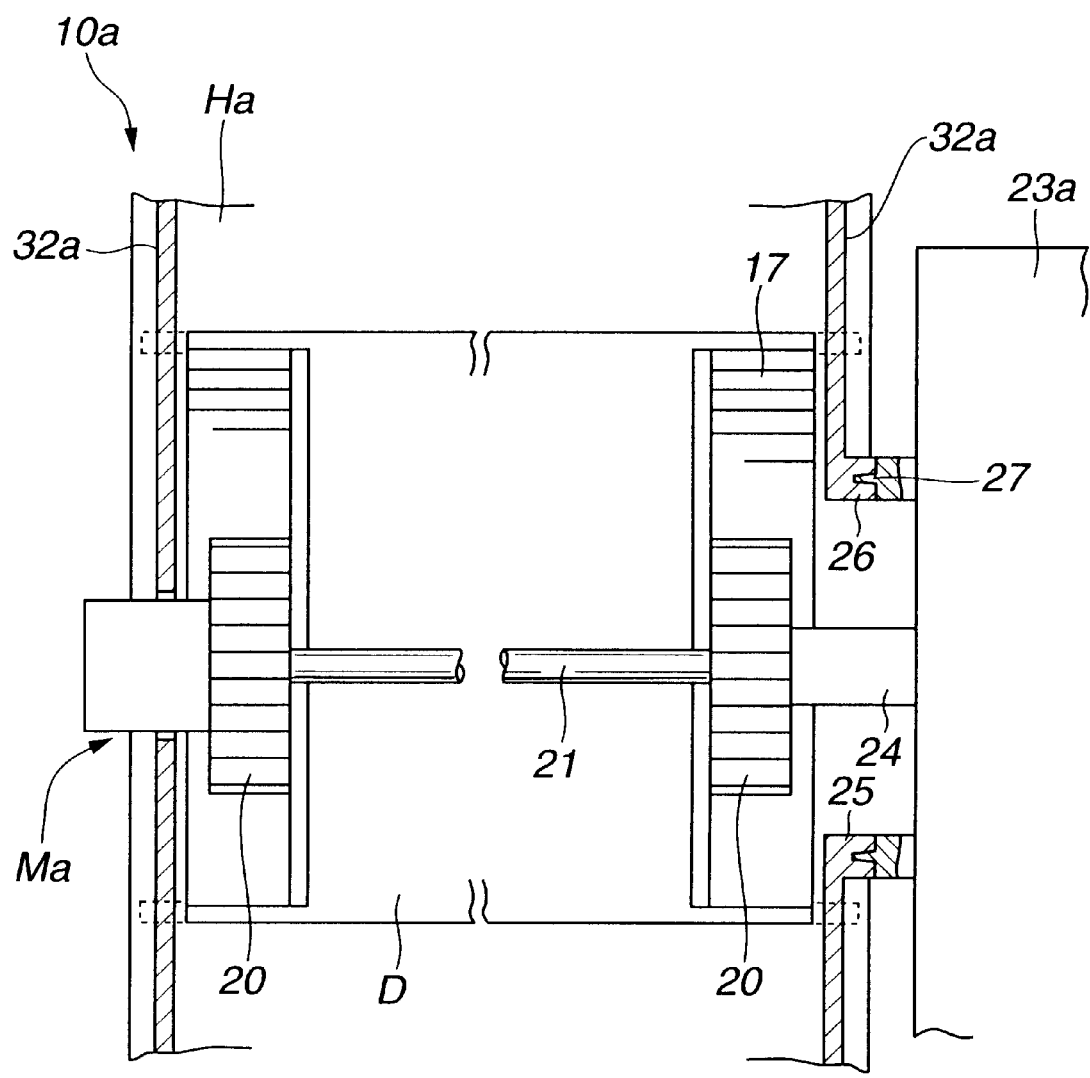
FIG. 8 is a view similar to FIG. 5, but showing a modification of the mixing door assembly, which is employable in the air conditioner of the present invention.

Referring to FIG. 8, there is shown a mixing door assembly (10a) which is a modification of the above-mentioned mixing door assembly (10).

The modified mixing door assembly (10a) comprises a mixing door member (D) and a sliding device (Ma). The mixing door member (D) comprises a mixing door member (D) which has two racks (17) at its lateral sides. As shown in the drawing, one of the gears (20) of the sliding device (Ma) is directly connected to an output shaft (24) of the electric actuator (23a). The two gears (20) mesh with the racks (17). One of the side walls (32a) of the door housing (Ha) is formed with a larger opening (25) through which the output shaft (24) passes. If the opening (25) is sufficiently large as shown, only a unit consisting of the two gears (20) and the shaft (21) can be easily removed from the mixing door assembly (10a) when needed, which makes the maintenance easy.

The opening (25) is hemmed by a circular ridge which has an annular groove (26) formed therein. An annular ridge (27) formed on a collar portion provided by the electric actuator (23a) is tightly put in the annular groove (26) to achieve a hermetical sealing therebetween.

With this modification, in addition to the above-mentioned advantages, the following advantages are obtained.

That is, the number of parts used, can be reduced, reducing the manufacturing cost. Furthermore, because the collar portion of the electric actuator (23a) fills up the opening (25), a separate cap for plugging the opening (25) may be omitted, reducing the work man-days and manufacturing cost. That is, the collar portion seals the opening (25) without the need of a cap.

If desired, the following modifications may be employed in the present invention.

That is, although the mixing door member (D) is described to be arcuate in shape, the same may be straight. Furthermore, according to the shape of the mixing door member (D), the sliding device (M, Ma) may be suitably modified so that the gears (20) mesh with the racks (17) on the sides of the mixing door member (D).

Furthermore, if desired, the air mixing chamber (9) may comprise a plurality of air mixing zones which are partitioned by a plurality of partition plates parallely installed in the width direction (in a longitudinal direction, as seen from the upstream side of the airflow) of the case and a plurality of sliding-type mixing door members which are provided for the air mixing zones. In this case, a plurality of air mis chambers can be provided in the case (C) with ease.

The entire contents of Japanese Patent Application 11-276434 (filed Sep. 29, 1999) are incorporated herein by reference.

Although the invention has been described above with reference to a certain embodiment of the invention, the invention is not limited to such embodiment as described above. Various modifications and variations of such embodiment may be carried out by those skilled in the art, in light of the above descriptions.

What is claimed is:

1. An automotive air conditioner, comprising:

an upstream side case defining an upstream air passage;

a downstream side case defining first and second downstream air passages which extend in parallel to an air mix chamber;

an evaporator installed in said upstream air passage;

a heater core installed in said first downstream air passage; and a mixing door assembly in a door housing disposed between said upstream and downstream side cases for varying an opening degree of said first and second downstream passages relative to said upstream air passage, wherein said upstream side case, said downstream side case and said mixing door assembly are mutually separable parts with said mixing door assembly detachably installed between said upstream side case and said downstream side case.

2. An automotive air conditioner, comprising:

an upstream side case defining an upstream air passage;

a downstream side case defining first and second downstream air passages which extend in parallel to an air mix chamber;

an evaporator installed in said upstream air passage;

a heater core installed in said first downstream air passage; and a mixing door assembly disposed between said upstream and downstream side cases for varying an opening degree of said first and second downstream passages relative to said upstream air passage, said mixing door assembly comprising:

a door housing;

a mixing door member movably installed in said door housing, said mixing door member varying the opening degree of said first and second downstream passages when moved; and a sliding device for moving the mixing door member relative to said door housing.

3. An automotive air conditioner as claimed in claim 2, in which said door housing is formed with a plurality of through holes into which projections formed on said upstream side case are respectively inserted upon assembly of said upstream and downstream side cases with said mixing door assembly put therebetween.

4. An automotive air conditioner as claimed in claim 3, in which said door housing comprises opposed side walls and partition walls each extending between said opposed side walls.

5. An automotive air conditioner as claimed in claim 4, in which each of said opposed side walls is formed with a pair of guide grooves, and in which said mixing door member is provided with guide rollers which are rotatably engaged with said guide grooves, said guide rollers provided at opposite sides of said mixing door assembly.

6. An automotive air conditioner as claimed in claim 5, in which each of said guide grooves has bent end portions.

7. An automotive air conditioner as claimed in claim 2, in which said sliding device comprises:

a rack provided by said mixing door member; and a gear rotatably held by said door housing and meshed with said rack.

8. An automotive air conditioner as claimed in claim 7, in which said gear comprises a row of shorter teeth and two groups of taller teeth which are arranged at both ends of said row of shorter teeth.

9. An automotive air conditioner as claimed in claim 7, in which said rack comprises a row of shorter teeth and two groups of taller teeth which are arranged at both ends of said row of shorter teeth.

10. An automotive air conditioner as claimed in claim 2, in which said mixing door member comprises:

a dome-shaped bulge portion; and two flat portions provided at upper and lower ends of said bulge portion.

11. An automotive air conditioner as claimed in claim 10, in which said mixing door member further comprises:

a plurality of reinforcement ribs integrally provided by said dome-shaped bulge portion;

a sealing member attached to a convex outer surface of a mixing door body of said mixing door member;

two reinforcement plates integrally formed in a concave surface of said dome-shaped bulge portion; and guide rollers rotatably connected to corners of said mixing door body.

12. An automotive air conditioner as claimed in claim 2, wherein said mixing door assembly is detachably installed between said upstream and downstream side cases.

13. An automotive air conditioner, comprising:

an upstream side case including an upstream air passage;

a downstream side case including first and second downstream air passages which extend in parallel to an air mix chamber in the downstream side case, respective mouth portions of said first and second downstream air passages facing a downstream end of said upstream air passage when said upstream and downstream side cases are coupled;

an evaporator installed in said upstream air passage;

a heater core installed in said first downstream air passages; and a mixing door assembly disposed between said upstream and downstream side cases, said mixing door assembly including a door housing and a sliding door member which is slidably installed in said door housing for varying an airflow rate between said first and second downstream passages.

14. An automotive air conditioner as claimed in claim 13, wherein said mixing door assembly is detachably installed between said upstream and downstream side cases.

* * * * *